United States Patent
Sekimoto

(10) Patent No.: US 9,219,851 B2
(45) Date of Patent: Dec. 22, 2015

(54) CAMERA MODULE AND ELECTRONIC DEVICE WITH A LENS BARREL INCLUDING A LOCAL MAXIMUM OUTER DIAMETER SECTION

(71) Applicant: SHARP KABUSHIKI KAISHA, Osaka (JP)

(72) Inventor: Yoshihiro Sekimoto, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 0 days.

(21) Appl. No.: 14/432,852

(22) PCT Filed: Oct. 3, 2013

(86) PCT No.: PCT/JP2013/076936
§ 371 (c)(1),
(2) Date: Apr. 1, 2015

(87) PCT Pub. No.: WO2014/057859
PCT Pub. Date: Apr. 17, 2014

(65) Prior Publication Data
US 2015/0271372 A1   Sep. 24, 2015

(30) Foreign Application Priority Data

Oct. 12, 2012 (JP) ................................. 2012-227413
Jun. 24, 2013 (JP) ................................. 2013-132049

(51) Int. Cl.
*H04N 5/225* (2006.01)

(52) U.S. Cl.
CPC .................................. *H04N 5/2254* (2013.01)

(58) Field of Classification Search
CPC ...... H04N 5/2254; G02B 15/14; G02B 15/00; G02B 15/15; G02B 7/10
See application file for complete search history.

(56) References Cited

U.S. PATENT DOCUMENTS

| | | | |
|---|---|---|---|
| 2007/0047938 A1* | 3/2007 | Suzuki | G02B 7/023 396/89 |
| 2007/0086769 A1* | 4/2007 | Watanabe | G02B 7/022 396/133 |
| 2010/0110270 A1 | 5/2010 | Sekimoto et al. | |
| 2011/0044679 A1* | 2/2011 | Yoshida | G02B 7/08 396/133 |
| 2013/0314810 A1 | 11/2013 | Sekimoto et al. | |

FOREIGN PATENT DOCUMENTS

| | | |
|---|---|---|
| JP | 2006-235539 | 9/2006 |
| JP | 2010-134409 | 6/2010 |

(Continued)

OTHER PUBLICATIONS

International Search Report for PCT/JP2013/076936 dated Jan. 7, 2014, one (1) page.

(Continued)

*Primary Examiner* — Nicholas Giles
(74) *Attorney, Agent, or Firm* — Nixon & Vanderhye, P.C.

(57) ABSTRACT

A lens barrel (3) includes a local maximum outer diameter section (3e) and a maximum outer diameter section (3a). The maximum outer diameter section (3a) is provided in a portion of an area of the local maximum outer diameter section (3e) which portion includes an area corresponding to an outer periphery of an image pickup lens (2m) which is the largest in lens diameter. This achieves a further size reduction while achieving a high-accuracy installation of a lens barrel.

10 Claims, 12 Drawing Sheets

(56) References Cited

FOREIGN PATENT DOCUMENTS

| | | |
|---|---|---|
| JP | 2010-230910 | 10/2010 |
| WO | WO 2012/108247 | 8/2012 |

OTHER PUBLICATIONS

Non-English Written Opinion of the ISA for PCT/JP2013/076936 dated Jan. 7, 2014, four (4) pages.

* cited by examiner

1 : OPTICAL SECTION
2 : IMAGE PICKUP LENSES
3 : LENS BARREL
3a: MAXIMUM OUTER DIAMETER SECTION
3e: LOCAL MAXIMUM OUTER DIAMETER SECTION
10 : LENS DRIVE DEVICE
11 : LENS HOLDER
22 : IMAGE PICKUP ELEMENT
40 : CAMERA MODULE

1 : OPTICAL SECTION
2 : IMAGE PICKUP LENSES
3 : LENS BARREL
3a: MAXIMUM OUTER DIAMETER SECTION
3e: LOCAL MAXIMUM OUTER DIAMETER SECTION
10 : LENS DRIVE DEVICE
11 : LENS HOLDER
22 : IMAGE PICKUP ELEMENT
40 : CAMERA MODULE

3 : LENS BARREL
3a: MAXIMUM OUTER DIAMETER SECTION
3e: LOCAL MAXIMUM OUTER DIAMETER SECTION
11 : LENS HOLDER

1 : OPTICAL SECTION
2 : IMAGE PICKUP LENSES
3 : LENS BARREL
3a: MAXIMUM OUTER DIAMETER SECTION
3e: LOCAL MAXIMUM OUTER DIAMETER SECTION
10 : LENS DRIVE DEVICE
11 : LENS HOLDER
11b: MINIMUM INNER DIAMETER SECTION
11e: LOCAL MINIMUM INNER DIAMETER SECTION
22 : IMAGE PICKUP ELEMENT
41 : CAMERA MODULE

3 : LENS BARREL
3a: MAXIMUM OUTER DIAMETER SECTION
3e: LOCAL MAXIMUM OUTER DIAMETER SECTION
11 : LENS HOLDER
11b: MINIMUM INNER DIAMETER SECTION
11e: LOCAL MINIMUM INNER DIAMETER SECTION

1 : OPTICAL SECTION
2 : IMAGE PICKUP LENSES
3 : LENS BARREL
3a: MAXIMUM OUTER DIAMETER SECTION
3e: LOCAL MAXIMUM OUTER DIAMETER SECTION
10 : LENS DRIVE DEVICE
11 : LENS HOLDER
11b: MINIMUM INNER DIAMETER SECTION
11e: LOCAL MINIMUM INNER DIAMETER SECTION
22 : IMAGE PICKUP ELEMENT
42 : CAMERA MODULE

F I G. 7
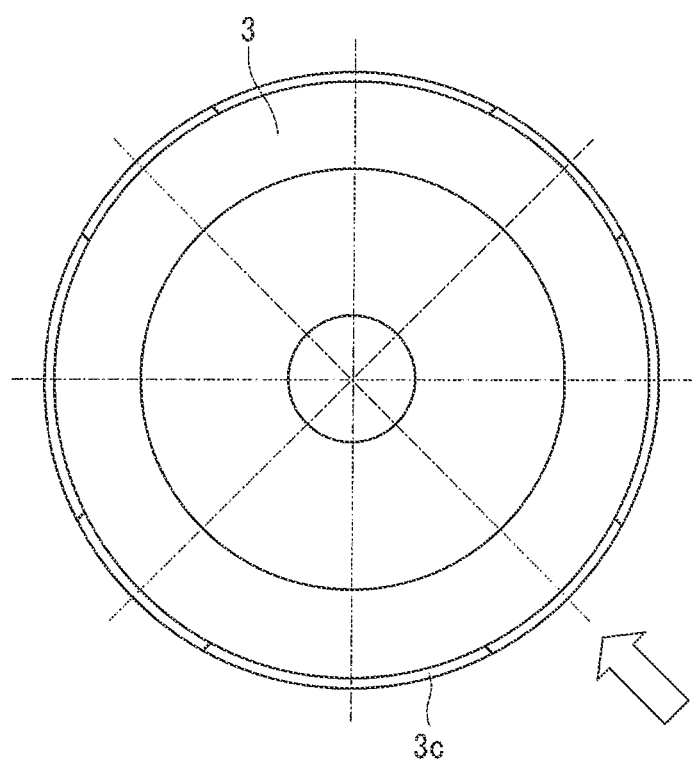

1 : OPTICAL SECTION
2 : IMAGE PICKUP LENSES
3 : LENS BARREL
3a: MAXIMUM OUTER DIAMETER SECTION
3e: LOCAL MAXIMUM OUTER DIAMETER SECTION
10 : LENS DRIVE DEVICE
11 : LENS HOLDER
22 : IMAGE PICKUP ELEMENT
43 : CAMERA MODULE

CAMERA MODULE AND ELECTRONIC DEVICE WITH A LENS BARREL INCLUDING A LOCAL MAXIMUM OUTER DIAMETER SECTION

This application is the U.S. national phase of International Application No. PCT/JP2013/076936 filed 3 Oct. 2013 which designated the U.S. and claims priority to JP Patent Application No. 2012-227413 filed 12 Oct. 2012 and JP Patent Application No. 2013-132049 filed 24 Jun. 2013, the entire contents of each of which are hereby incorporated by reference.

TECHNICAL FIELD

The present invention relates to (i) a camera module, which is incorporated into an electronic device such as a mobile phone, having an autofocus function and an image stabilization function, and (ii) an electronic device. The present invention provides a camera module which eliminates a focus adjustment with use of a screw, thus maximizing a space-saving effect by eliminating a screw of a lens barrel, and enhancing strength of fixation of the lens barrel in a lens holder without a use of a screw.

BACKGROUND ART

On the recent mobile phone market, models of mobile phones having built-in camera modules have become dominant. These camera modules need to be embedded in the mobile phones. Therefore, the camera modules face greater demands for being compact and lightweight, as compared with camera modules to be embedded in digital cameras.

Among such camera modules, there have been an increasing number of camera modules that (i) achieve their autofocus (AF) functions with the use of lens drive devices and (ii) are mounted on electronic devices such as mobile phones. Various types of lens drive devices have been developed so far, and examples of the lens drive devices encompass those employing stepper motors, those employing piezoelectric sensors, and those employing Voice Coil Motors (VCM). Such lens drive devices have already been distributed on the market.

Meanwhile, in such a circumstance that the camera module having the autofocus (AF) function has become standard, the image stabilization function has been attracting attention as a next distinctive feature for camera modules. Although the image stabilization function is widely employed in digital cameras and camcorders, there have been only a few mobile phones employing the image stabilization function, due to their limited sizes. Nevertheless, mobile-phone-specified camera modules having the image stabilization function are expected to be mainstream in the future, and, in fact, there have been an increasing number of proposals on a novel structure of an image stabilization system which achieves reduction in size.

As for the camera module having the autofocus function, Patent Literature 1 discloses a highly potential technique for achieving reduction in size and a small tilt. Patent Literature 1 has proposed a technique for eliminating a screw structure for focus adjustment, which screw structure is provided both in the lens barrel and in the lens holder, to omit a space for a screw thread.

Specifically, a camera module disclosed in Patent Literature 1 is, as illustrated in FIG. 10, a camera module 100 having the AF function. The camera module 100 includes (i) an optical section 101, (ii) a lens drive device 102 for driving the optical section 101 in an optical axis direction, and (iii) an image pickup section 103 on which the lens drive device 102 is mounted. The image pickup section 103 is constituted by a lamination of a sensor cover section 104 and a substrate 105. The optical section 101 is constituted by a plurality of image pickup lenses 106 and a lens barrel 107 holding the plurality of image pickup lenses 106. The lens drive device 102 includes (i) a lens holder 108 holding the lens barrel 107 and being driven in the optical axis direction of the optical section 101 (ii) an upper leaf spring 109a and a lower leaf spring 109b supporting the lens holder 108 so as to be movable in the optical axis direction of the optical section 101, (iii) an AF coil 110 integrally fixed to the lens holder 108, (iv) a yoke 111 constituting a fixing section, (v) a magnet 112, fixed to an inner wall of the yoke 111, generating an electromagnetic force between itself and the AF coil 110, (vi) a cover 114, provided on an upper surface side of the yoke 111, for protecting the upper leaf spring 109a, and (vii) a base 115, provided on a bottom surface side of the yoke 11, supporting the whole of the lens drive device 102. The sensor cover section 104 includes an infrared ray (IR) cut filter 120, an image pickup element 121, and a sensor cover 122. The image pickup element 121 is mounted on the substrate 105.

In the camera module 100 disclosed in Patent Literature 1, an outer periphery of the lens barrel 107 and an inner periphery of the lens holder 108 are not threaded. Further, the camera module 100 has a structure eliminating the need for focus adjustment, i.e. the structure that the lens barrel 107 is positioned by being brought into contact with on the upper surface side of the sensor cover 122. This enables the camera module to become smaller in size by a screw thread.

Furthermore, in the camera module 100 disclosed in Patent Literature 1, the outer periphery of the lens barrel 107 and the inner periphery of the lens holder 108 are arranged such that the lens barrel 107 and the lens holder 108 each have the same diameter across their whole areas. In other words, the lens barrel 107 and the lens holder 108 are formed in a flat cylindrical shape.

The camera module 100 disclosed in Patent Literature 1 has the autofocus function. However, the focus-adjustment-less structure is applicable to a camera module which has an image stabilization function as well as the autofocus function. Patent Literature 2 discloses a focus-adjustment-less structure of a camera module having both the auto focus function and the image stabilization function. Patent Literature 2 further discloses a step structure having a maximum outer diameter section formed in a belt shape, instead of having a lens barrel being flat in outer shape and being formed in a cylindrical shape.

Note that, as used herein, the "maximum outer diameter section (formed in a belt shape)" of the lens barrel has certain thicknesses in a height direction of the lens barrel (in an optical axis direction of the optical section) and in a width direction of the lens barrel (in a direction vertical to the optical axis of the optical section), and is a protrusion provided so as to surround a side surface of the lens barrel. The maximum outer diameter section has the largest outer diameter in the lens barrel in the width direction of the lens barrel.

The following discusses a meaning of having the step structure in the outer shape of the lens barrel as disclosed in Patent Literature 2, with reference to (a) and (b) of FIG. 11.

The camera module disclosed in Patent Literature 2 includes a lens barrel 151 having (i) a maximum outer diameter section provided partially in the lens barrel 151 rather than entirely in the lens barrel 151 and (ii) the other sections having slightly smaller diameters (see (a) of FIG. 11 illustrating a sectional view of a main part of the camera module). More specifically, the camera module illustrated in (a) of FIG.

11 includes the lens barrel 151 having a maximum outer diameter section 151a formed in a belt shape. Here, an angle of inclination θ of the lens holder 152 with respect to a surface of a sensor cover (a dummy sensor cover 153) is expressed as a difference between $\theta_1$ and $\theta_2$ in (b) of FIG. 11 and is set to satisfy the following expression:

$$\theta \leq \tan^{-1}(H/D_E) - \cos^{-1}(D_1/\sqrt{(D_E^2 + H^2)})$$

wherein $D_E$ is an outer diameter of the maximum outer diameter section 151a of the lens barrel 151, H is a thickness of the maximum outer diameter section 151a, and $D_1$ is a cylindrical inner diameter of the lens holder 152.

Hence, by controlling an inclination (tilt) of the cylindrical hole of the lens holder 152 to within a predetermined range when the lens barrel 151 is inserted into the lens holder 152 while the lens barrel 151 is being slid within the cylindrical hole of the lens holder 152, installation of the lens barrel 151 can be performed with reference to the sensor cover (dummy sensor cover 153), without being influenced by an inclination of the cylindrical hole of the lens barrel 151.

In other words, in a case where the value H becomes too large, a tolerance value of the tilt of the lens holder 152 becomes smaller. As a result, it becomes difficult to fix the lens holder 152 with a high accuracy.

CITATION LIST

Patent Literature 1
Japanese Patent Application Publication
Tokukai No. 2010-134409 (published on Jun. 17, 2010)
Patent Literature 2
International Patent Application Publication
WO No. 2012/108247 (published on Aug. 16, 2012)

SUMMARY OF INVENTION

Technical Problem

Unfortunately, the camera module disclosed in Patent Literature 1 and the step structure of the lens barrel disclosed in Patent Literature 2 have the following problems.

First, the camera module disclosed in Patent Literature 1 does not have a step structure to form a maximum outer diameter section partially at an outer wall of a lens barrel, and the lens barrel has a cylindrical structure such that the lens barrel is flat in outer shape. Therefore, as mentioned above in the descriptions as to Patent Literature 2, a tolerable range of a tilt of the lens holder becomes narrow. As a result, there is a high possibility that the lens barrel is mounted with inclination due to the tilt of the lens holder.

Meanwhile, in an example of Patent Literature 2, the step structure is provided in the lens barrel, and the maximum outer diameter section of the lens barrel is formed in a belt shape. This achieves a wider tolerable range of the tilt of the lens holder.

However, the step structure of the lens barrel recited in Patent Literature 2 is such that a belt shaped maximum outer diameter section is provided in a position close to an upper surface of the lens barrel. Generally, among a plurality of image pickup lenses which are held inside the lens barrel, the nearer to an upper surface side (object side) one lens of the plurality of image pickup lenses is disposed, the smaller in diameter the lens becomes. As a result, the step structure disclosed in Patent Literature 2 forms the maximum outer diameter section in a portion of the lens barrel which corresponds to a portion having a small lens diameter by causing the maximum outer diameter section to have a thickness more than required. That is, the belt-shaped maximum outer diameter section according to Patent Literature 2 is thicker than necessary in a cylindrical portion of the lens barrel. This is a demerit in terms of size reduction of the camera module.

The present invention is attained in view of the above problems. An object of the present invention is to provide a camera module and an electronic device both of which allow for a high-accuracy installation of a lens barrel and a further size reduction.

Solution to Problem

In order to solve the above problem, a camera module of the present invention includes: an optical section including: a plurality of image pickup lenses; and a lens barrel for holding the plurality of image pickup lenses inside; a lens drive device, including a lens holder, for driving the lens holder integrally with the lens barrel, the lens holder allowing the lens barrel to be fixed therein after being adjusted in relative position with respect to the lens barrel; and an image pickup element for receiving light passing through the plurality of image pickup lenses, the lens barrel being slidable within the lens holder when the lens barrel is not fixed in the lens holder, the lens barrel being formed in a cylindrical shape extending in an optical axis direction of the optical section, the lens barrel including (i) a local maximum outer diameter section covering an outer periphery of the image pickup lens having the second largest lens diameter among the image pickup lenses and (ii) a maximum outer diameter section being a protrusion provided in the local maximum outer diameter section, and the maximum outer diameter section being provided in a portion of an area of the local maximum outer diameter section which portion includes an area corresponding to an outer periphery of the image pickup lens having the largest lens diameter among the image pickup lenses.

Advantageous Effects of Invention

The camera module of the present invention yields the effect of achieving a further size reduction of the camera module while achieving a high-accuracy installation of the lens barrel.

BRIEF DESCRIPTION OF DRAWINGS

FIG. 7 is a top view illustrating a structure of the lens barrel illustrated in FIG. 6.

FIG. 11 is an enlarged view illustrating a main part of the conventional camera module, illustrating a structure of a lens barrel of the conventional camera module, and illustrating an idea of what a tilt is like.

DESCRIPTION OF EMBODIMENTS

Embodiment 1

Figure 1:
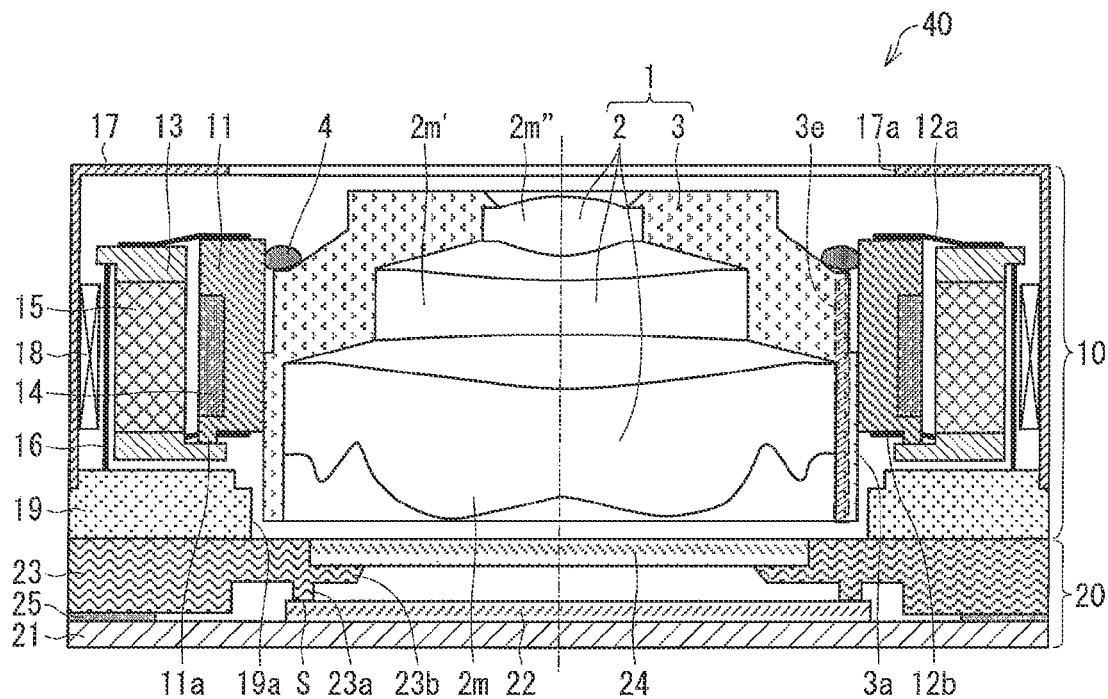
FIG. 1 is a central cross-sectional view illustrating a camera module of one embodiment of the present invention and particularly illustrating structures of a lens barrel and a lens holder.
Figure 2:
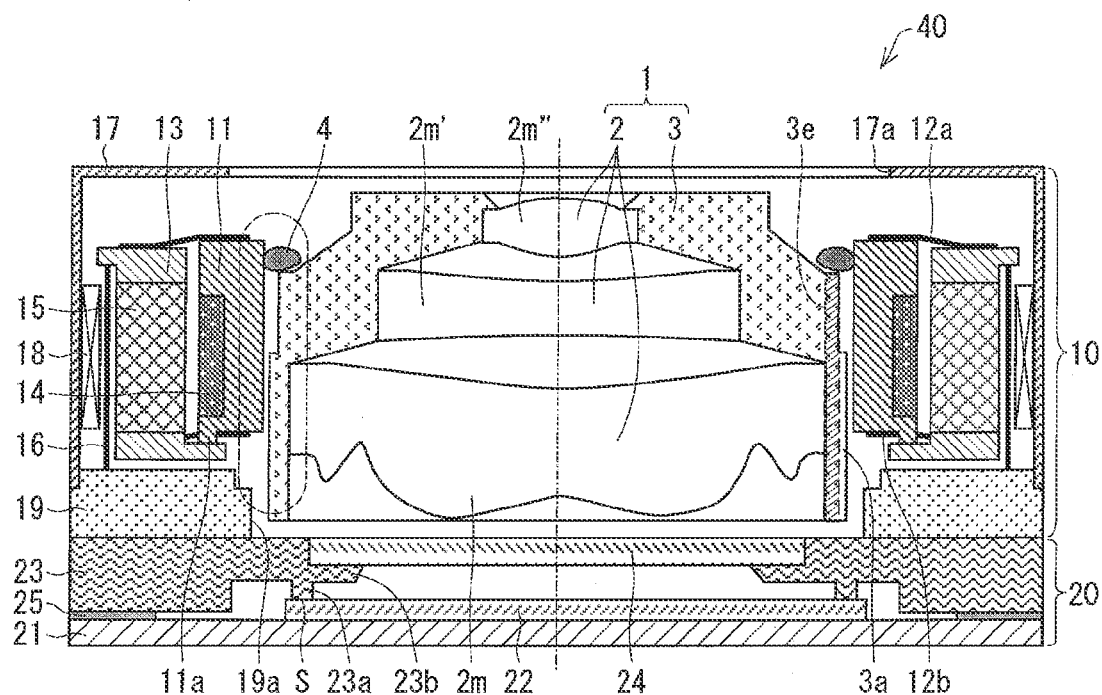
FIG. 2 is a central cross-sectional view illustrating a state that a gap between the lens barrel and the lens holder occurs, in the camera module illustrated in FIG. 1, due to tolerances of members.
Figure 3:
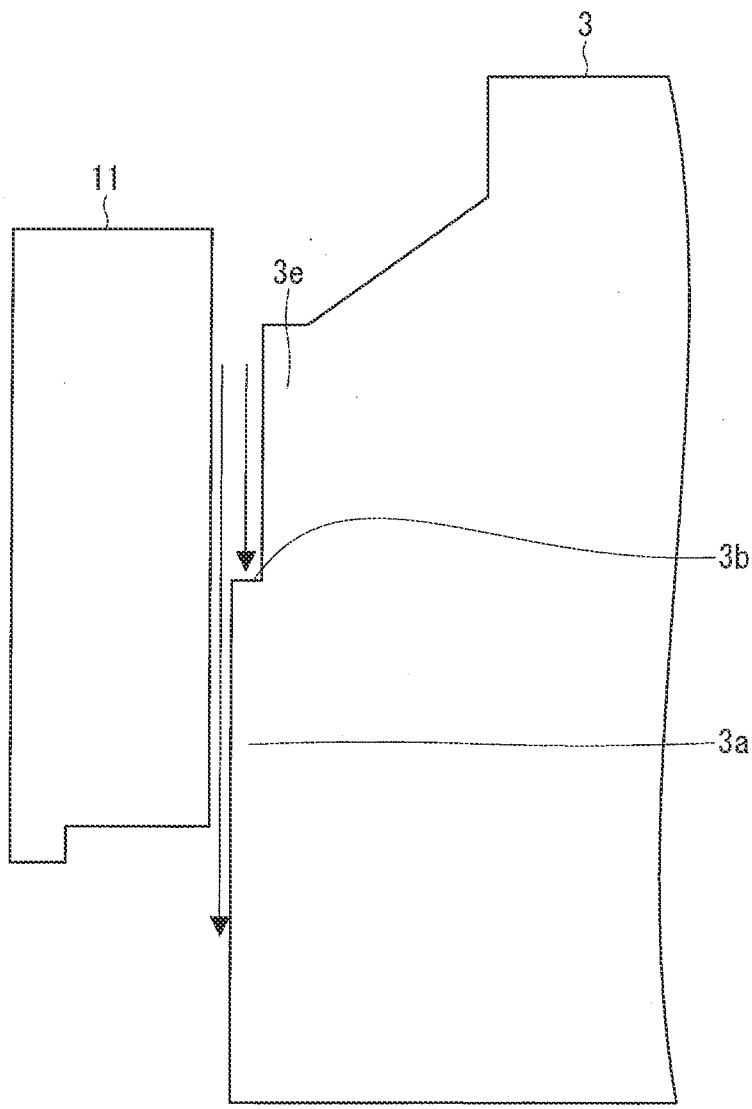
FIG. 3 is an enlarged view illustrating an oval region enclosed by a dashed line in FIG. 2 and illustrating the structures of the lens barrel and the lens holder in the camera module illustrated in FIG. 2.

The following discusses Embodiment 1 of the present invention with reference to FIGS. 1 to 3.

Note that, the following description as to a camera module of Embodiment 1 assumes that the camera module has an image stabilization function. This is, however, not the only possibility. Therefore, a configuration of the camera module of Embodiment 1 may be applied to a camera module having an autofocus function and not having the image stabilization function.

(Configuration of Camera Module)

First, the following discusses a configuration of a camera module of Embodiment 1 with reference to FIG. 1. FIG. 1 is a central cross-sectional view illustrating the camera module of Embodiment 1 and particularly illustrating structures of a lens barrel and a lens holder.

A camera module 40 of Embodiment 1 is a camera module used in an electronic device such as a mobile phone equipped with a camera module. The camera module 40 includes an image pickup section 20, an optical section 1 contained inside a cover 17, and a lens drive device 10 for driving the optical section 1. The image pickup section 20 is a rectangular member provided in a lower section of the camera module 40. The cover 17 is a box-shaped member provided above the image pickup element 20. At a center of an upper surface of the cover 17, an aperture 17a is formed for exposing image pickup lenses 2 (described later) provided in the optical section 1.

For the sake of convenience, the following description assumes that an optical section 1 side (i.e. a side on which an object is provided) is an upper side of the camera module 40, and an image pickup section 20 side (i.e. an image pickup element 20 side) is a lower side of the camera module 40.

As illustrated in FIG. 1, the optical section 1 includes a plurality of image pickup lenses 2 and a lens barrel 3 holding the plurality of image pickup lenses 2 inside.

The plurality of image pickup lenses 2 include image pickup lenses having different lens diameters. As an example, the plurality of image pickup lenses 2 include three image pickup lenses, i.e. an image pickup lens 2m having the largest lens diameter, an image pickup lens 2m' having the second largest lens diameter, and an image pickup lens 2m" having the smallest lens diameter. The image pickup lens 2m' is provided on a surface of the image pickup lens 2m, and the image pickup lens 2m" is provided on a surface of the image pickup lens 2m'. As described above, the plurality of image pickup lenses 2 include the image pickup lens 2m, the image pickup lens 2m', and the image pickup lens 2m" which are provided in such an order that diameters of the lenses become smaller from the lower side to the upper side of the camera module 40.

Note that, the number of lenses included in the plurality of image pickup lenses 2 is not limited to be three as long as the plurality of image pickup lenses 2 are two or more lenses. The plurality of image pickup lenses 2 may include two image pickup lenses, or may include four or more image pickup lenses.

Further, a lens holder 11 is provided around the optical section 1. The lens holder 11 holds the lens barrel 3 inside of it with the lens barrel 3 adhesively fixed in the lens holder 11 with use of an adhesive 4. The lens holder 11 is provided in the lens drive device 10 for driving the optical section 1.

Before the lens barrel 3 is fixed in the lens holder 11 with use of the adhesive 4, the lens barrel 3 is slidable within the lens holder 11 along a direction in which a cylindrical-shaped aperture provided in the lens holder 11 extends. After relative positions of the lens barrel 3 and the lens holder 11 are adjusted, the lens barrel 3 is fixed in the lens holder 11 with use of the adhesive 4.

The image pickup section 20 provided in a lower section of the lens drive device 10 includes a substrate 21, an image pickup element 22, a sensor cover 23, and a glass substrate 24. The image pickup element 22, provided on the substrate 21, receives light having passed through the plurality of image pickup lenses 2 provided in the optical section 1 and carries out a photoelectric conversion of the received light. The sensor cover 23 and the glass substrate 24 particularly cover and protect a light-receiving section (not illustrated in the drawings) of the image pickup element 22. The substrate 21, the image pickup element 22, the sensor cover 23, and the glass substrate 24 are stacked in this order from the lower section of the camera module 40 in the optical axis direction of the optical section 1 (more specifically, a combination of lenses constituted by the plurality of image pickup lenses 2).

As described above, the lens drive device 10 includes, as a constituent component thereof, the lens holder 11 in which the lens barrel 3 of the optical section 1 is fixed with use of the adhesive 4. The lens holder 11 is supported by upper and lower autofocus (AF) springs 12a and 12b so as to be movable along the optical axis direction of the optical section 1 with respect to an intermediate member 13. Further, an AF coil 14 is fixed to an outer periphery portion of the lens holder 11. In the intermediate member 13, a permanent magnet for AF driving and a permanent magnet for image stabilization are fixed. In Embodiment 1, a permanent magnet 15, which serves as these two permanent magnets, is fixed in the intermediate member 13.

Furthermore, a protrusion 11a is formed in a lower section of the lens holder 11. The protrusion 11a contacts the intermediate member 13 at a mechanical end on an infinity side in a movable range in the optical axis direction of the optical section 1 (reference position on the image pickup element 22 side in the movable range). The intermediate member 13 is supported by four elastic wires 16 (only two wires are illustrated in the drawing) so as to be movable, with respect to a fixing section described later, in two directions, i.e., the optical axis direction of the optical section 1 and in a direction vertical to the optical axis direction. As a result, the intermediate member 13, the permanent magnet 15, the AF springs 12a and 12b, the lens holder 11, the AF coil 14, the lens barrel 3, and the plurality of image pickup lenses 2 are integrally driven in the direction vertical to the optical axis of the optical section 1.

The fixing section includes the cover 17, an Optical Image Stabilizer (OIS) coil 18, and a base 19. The base 19 has an aperture 19a formed in a center portion of the base 19. The lens barrel 3 is partially provided inside of the aperture 19a in a state that the optical section 1 is incorporated into the lens holder 11. This configuration is likely to be employed for a camera module because it is difficult to reserve a sufficiently large distance (flange focal distance) between a lower end surface of the lens barrel 3 and a light-receiving section of the image pickup element 22.

The lens barrel 3 and the base 19 are spaced at an appropriate distance. Otherwise, a displacement of the lens holder 11 due to a shock such as a drop impact may cause a collision between the lens barrel 3 and the base 19, resulting in a serious impact on the lens barrel 3. Therefore, the value of the gap between the lens barrel 3 and the base 19 is appropriately set so that the lens barrel 3 does not directly contact the base 19 even when the lens holder 11 is displaced in a maximum amount.

Next, the sensor cover 23 is a member of the image pickup section 20 on which the lens drive device 10 is mounted. The sensor cover 23 has a protrusion 23a provided at a lower section thereof, and a tip of the protrusion 23a forms a reference surface S. The reference surface S is in contact with the image pickup element 22. Further, the sensor cover 23 is mounted on the image pickup element 22 so as to cover the whole of the image pickup element 22. Further, the sensor cover 23 has an aperture 23b provided on the image pickup lens 2 side. The aperture 23b is covered by the glass substrate 24 having an infrared ray cut function.

The image pickup element 22 is mounted on the substrate 21. In some cases, a gap between the substrate 21 and the sensor cover 23 may occur due to a tolerance. However, an adhesive 25 fills the gap and adhesively fixes the substrate 21 with the sensor cover 23.

In Embodiment 1, neither the lens barrel 3 nor the lens holder 11 are threaded. Further, the lens barrel 3 is fixed at a predetermined position in a state that the lens holder 11 is located at the mechanical end on the infinity side. A gap of at least about 10 μm is provided between the lens barrel 3 and the sensor cover 23. The gap between the lens barrel 3 and the sensor cover 23 eliminates a contact between the lens barrel 3 and the sensor cover 23 even when the lens barrel 3 is driven in the direction vertical to the optical axis of the optical section 1. This makes it possible to stably carry out an image stabilization operation. This further prevents a foreign matter from being generated due to friction.

As described above, it can be understood that the camera module 40 includes (i) the optical section 1 including the plurality of image pickup lenses 2 and the lens barrel 3 which holds the plurality of image pickup lenses 2 inside, (ii) the lens holder 11 in which the lens barrel 3 is fixed, (iii) the lens drive device 10 which drives the lens holder 11 integrally with the lens barrel 3, and (iv) the image pickup element 22 which receives light having passed through the plurality of image pickup lenses 2.

(AF Function and Image Stabilization Function of Camera Module)

In order for the optical section 1 to move back and forth in the optical axis direction for the focus adjustment, the camera module 40 configured as above according to Embodiment 1 is operated in the following manner. That is, a current flows through the AF coil 14 of the lens drive device 10 in response to a drive instruction from a control section (not illustrated in the drawing) of, for example, a mobile phone or a digital camera which is equipped with the camera module. Thus, the current passing through the AF coil 14 acts on a magnetic field generated from a permanent magnet 15, thus generating a thrust force to move the AF coil 14 in the optical axis direction. This causes the AF springs 12a and 12b and the lens holder 11 to move the optical section 1 back and forth in the optical axis direction. In this manner, the optical section 1 can be controlled to perform autofocus (AF) function. Hence, the AF coil 14, the permanent magnet 15, the AF springs 12a and 12b, and the lens holder 11 serve as an autofocus section.

Further, in order for the optical section 1 to be integrally driven in the direction vertical to the optical axis direction by means of the OIS, the camera module 40 is operated in the following manner. A current flows through an OIS coil 18 of the lens drive device 10 in response to a drive instruction from the control section (not illustrated in drawing) of, for example, a mobile phone or a digital camera which is equipped with the camera module. Thus, the current passing through the OIS coil 18 acts on a magnetic field generated from the permanent magnet 15, thus generating a thrust force to move the OIS coil 18 in the direction vertical to the optical axis of the optical section 1. This causes the elastic wires 16, the intermediate member 13, the AF springs 12a and 12b, and the lens holder 11 to move the optical section 1 back and forth in the direction vertical to the optical axis. In this manner, the optical section 1 can be controlled to perform image stabilization. Hence, the OIC coil 18, the permanent magnet 15, the elastic wires 16, the intermediate number 13, the AF springs 12a and 12b, and the lens holder 11 serve as an image stabilization section.

(Installation position of Optical Section into Lens Holder)

Next, the following discusses a position at which an optical section 1 including the image pickup lenses 2 and the lens barrel 3 is installed into the lens holder 11 of the lens drive device 10.

It is desirable that the image pickup lenses 2 are installed into the lens holder 11 at such a position distance from the light-receiving section of the image pickup element 22 that a focus point of the image pickup lenses 2 is located at the mechanical end on the infinity side However, variations in installation positions of the individual members constituting the camera module 40 remain due to a tolerance of the attachment positions of the plurality of image pickup lenses 2 to the lens barrel 3, a tolerance of a thickness of the sensor cover 23, and other tolerances. Therefore, positioning of the individual members without carrying out the focus adjustment remains errors on the attachment positions of the individual members. Even in the presence of such errors, it is necessary to find a focus position within a stroke of the lens drive device 10 of the camera module 40. Therefore, the lens barrel 3 needs to be attached to the lens holder 11 so that the image pickup lenses 2 are located at a position which is slightly shifted closer to the image pickup element 22 side from a center of a designed value of the focus position. At this time, the amount of shift toward the image pickup element 22 side is referred to as an over-infinity. As the over-infinity is set to be large, the stroke of the lens drive device 10 becomes large accordingly. The over-infinity therefore needs to be minimized.

Concerning a total sum of the above various tolerances, an appropriate value of the over-infinity is approximately 25 μm. However, since the value of the over-infinity is varied according to a tolerance of manufacturing of the members and a tolerance of assembling of the members, it is desirable that the over-infinity is set to a minimum value corresponding with an actual condition. In the camera module 40, the sensor cover 23 whose accuracy with respect to thickness is sufficiently improved is employed. Further, the reference surface S is brought into direct contact with the image pickup element 22. Then, positioning of the lens barrel 3 with respect to the upper surface of the sensor cover 23 (lower surface of the lens drive device 10) is carried out with a high accuracy. As a result, the over-infinity as small as about 25 µm is achieved.

Here, assume that in FIG. 1, the lens barrel 3 is attached to a position which is shifted closer by 25 µm to the image pickup element 22 from a location where an object at infinity is to be focused, and there is a gap between the sensor cover 23 and the lens barrels 3. The following description is based on the assumption.

Note that, the lens barrel 3 is positioned with respect to the lens holder 11, and then fixed with the adhesive 4. In order to prevent the adhesive 4 from flowing into an undesired part, a top part of a wall of the lens holder 11 (inner wall of the lens holder 11 in FIG. 1) including spots on which the adhesive 4 is to be applied to the lens holder 11 is arranged to be located at a position higher than spots on which the adhesive 4 is to be applied to the lens barrel 3. A specific example of the arrangement includes an arrangement in which the wall of the lens holder 11 is sufficiently elongated toward the upper surface of the camera module 40 and an arrangement in which notches or the like for application of the adhesive 4 are provided on the lens barrel 3 side.

Meanwhile, in a case where the wall of the lens holder 11 including the spots on which the adhesive 4 is to be applied to the lens holder 11 is elongated toward the upper surface of the camera module 40, it is not necessary to elongate an entire circumferential wall of the lens holder 11. Alternatively, the wall of the lens holder 11 may be elongated in only parts corresponding to the spots where the adhesive 4 is to be actually applied. Generally, the adhesive 4 is applied on approximately four points around the outer periphery of the lens barrel 3. In a case where the wall of the lens holder 11 is elongated in part, not in entirety, the strength of the wall may decrease. The lens holder 11 having the wall of a low strength may cause the lens holder 11 to have an insufficient resistance to an impactive force directly applied onto the wall of the lens holder 11 due to a drop impact or the like of the camera module 40. Therefore, in order to prevent an impactive force from being directly applied onto the wall of the lens holder 11, it is desirable to provide a gap between the lens holder 11 and the sensor cover 17 within a movable range of the lens holder 11 so that the wall of the lens holder 11 and the cover 17 do not collide with each other.

(Method for Manufacturing Camera Module)

The following briefly discusses a method for manufacturing the camera module 40 of Embodiment 1.

As described earlier, the camera module 40 is arranged such that the lens barrel 3 is not threaded at its outer periphery. Further, the lens barrel 3 is slidable within the cylindrical hole of the lens holder 11, which hole is provided for containing and holding the lens barrel 3. Therefore, the lens barrel 3 needs to be positioned with respect to the lens holder 11 so as to be at a desirable height.

The height of the lens barrel 3 is determined with use of a jig (not illustrated in the drawing). In a step performed before the lens drive device 10 is mounted on the image pickup section 20, the lens drive device 10 is mounted on the jig. While the height of the lens barrel 3 is determined with use of the jig, the lens barrel 3 is adhesively fixed in the lens holder 11. Thereafter, the jig is removed, and the lens drive device 10 having the lens barrel 3 fixed therein is then mounted on the image pickup section 20.

Thus, the camera module 40 is arranged such that the lens barrel 3 is slidable within the lens holder 11 before the lens barrel 3 is fixed in the lens holder 11.

(Structures of Lens Barrel and Lens Holder)

Figure 11:
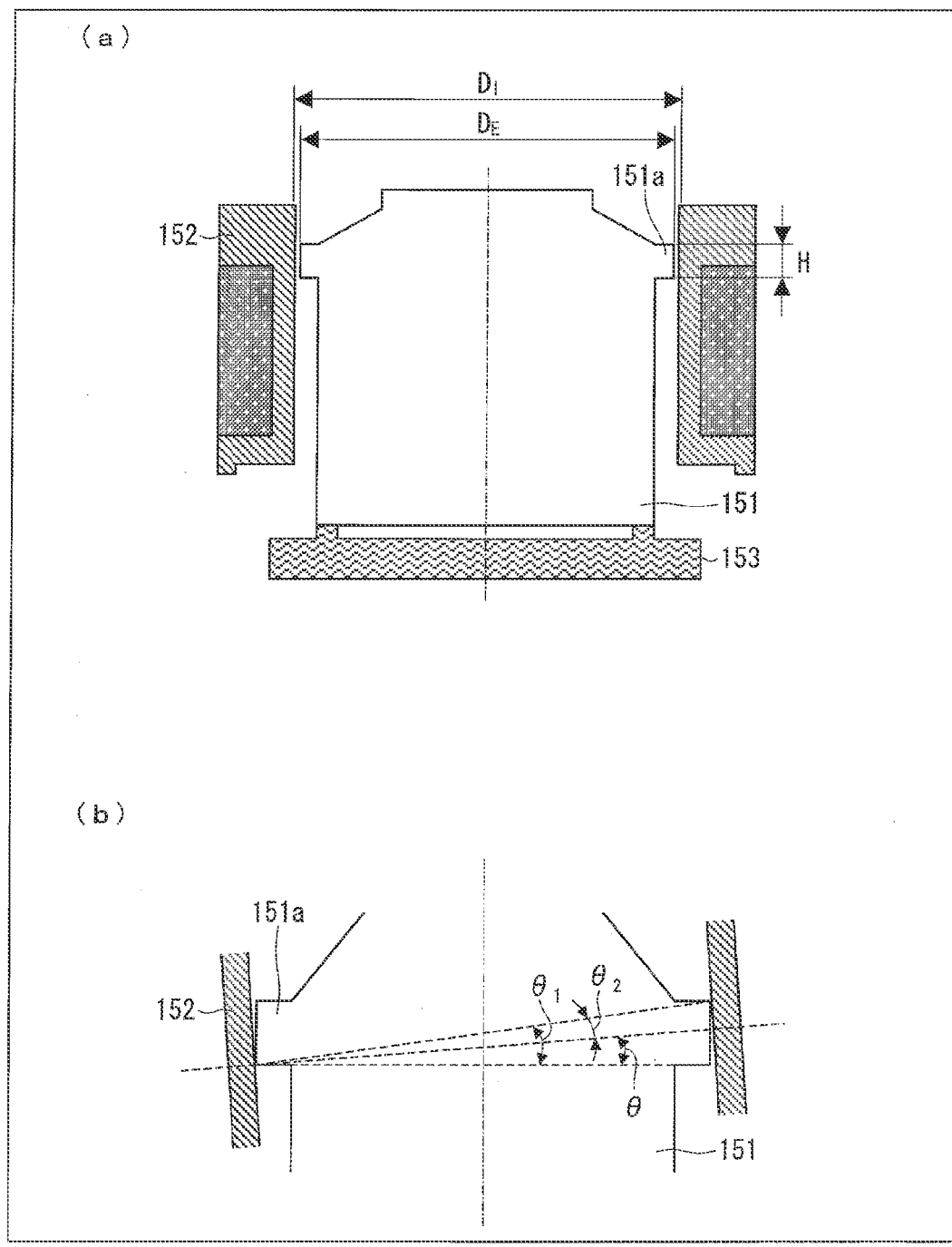

As described above, the lens barrel 3 is slidable before the lens barrel 3 is fixed in the lens holder 11. However, when the lens barrel 3 moves, only a portion of the lens barrel 3 serves as a guide for the sliding. Such a portion is not provided at a position near a top surface of the lens barrel 3 as illustrated in FIG. 11. The portion is provided so as to correspond to an outer periphery of the image pickup lens 2m which has the largest lens diameter (i.e. the portion is provided at the same height of the outer periphery of the image pickup lens 2m). Hence, the lens barrel 3 is formed in such a shape that a protrusion is provided on each side surface of a cylindrical-shaped portion extending in the optical axis direction of the optical section 1. Further, the lens barrel 3 includes at least a local maximum outer diameter section 3e covering the outer periphery of the image pickup lens 2m' which is the second largest in lens diameter, and a maximum outer diameter section 3a (formed in, for example, a belt shape) which corresponds to the protrusion provided in the local maximum outer diameter section 3e. In other words, the local maximum outer diameter section 3e in the side wall of the lens barrel 3 faces the inner wall of the lens holder 11. Therefore, the lens barrel 3 has an outer shape formed in a step structure in which (i) a lower portion of the local maximum outer diameter section 3e is the maximum outer diameter section 3a and (ii) an upper portion of the local maximum outer diameter section 3e is an upper section having a slightly smaller diameter than that of the maximum outer diameter section 3a. This is because, as illustrated in FIG. 1, the plurality of image pickup lenses 2 which are held inside the lens barrel 3 are generally arranged such that the nearer the top surface (side on which an object is provided), the smaller the diameter of the lens.

In a case where the lens barrel 3 with a minimum thickness is configured so as to hold the image pickup lens 2m, the lens barrel 3 has the largest outer diameter in a portion corresponding to the outer periphery of the image pickup lens 2m. In an example illustrated in FIG. 11, it is inevitable to provide a belt-shaped maximum outer diameter section whose diameter is further larger than the outer diameter of the lens barrel 3 at the outer periphery of the image pickup lens 2m. For this reason, in this example, a space formed in correspondence with the shape of the lens barrel becomes unnecessarily large, and the lens barrel has an unnecessary thickness.

On the other hand, the camera module 40 includes the lens barrel 3 covering an outer periphery of the plurality of image pickup lenses 2, which outer periphery is constituted by side surfaces of the plurality of image pickup lenses 2. The lens barrel 3 has, at its side wall, protrusions such that the outer diameter of the lens barrel 3 increases in conformity with the outer diameters of the plurality of image pickup lenses 2.

Of the side wall of the lens barrel 3, a portion covering the outer periphery of the image pickup lens 2m", which has the smallest outer diameter, is a portion having the smallest outer diameter.

Of the side wall of the lens barrel 3, a portion covering the outer periphery of the image pickup lens 2m', which has the second largest outer diameter, is an upper portion of the local maximum outer diameter section 3e. The upper portion of the local maximum outer diameter section 3e surrounds the outer periphery of the image pickup lens 2m', and is a belt-shaped protrusion extending in a circumference direction of the lens barrel 3. In other words, in the local maximum outer diameter section 3e, its upper portion is a portion facing the inner wall of the lens holder 11 and not being provided with the maximum outer diameter section 3a.

Of the side wall of the lens barrel 3, a portion covering the outer periphery of the image pickup lens 2m, which has the largest outer diameter, is a lower portion of the local maximum outer diameter section 3e in which lower portion the maximum outer diameter section 3a is provided. Of the side wall of the lens barrel 3, the maximum outer diameter section 3a has the largest outer diameter. The maximum outer diameter section 3a is a belt-shaped protrusion surrounding the outer periphery of the image pickup lens 2m and extending in the circumference direction of the lens barrel 3.

Providing the maximum outer diameter section 3a around the outer periphery of the image pickup lens 2m, as compared to not providing the maximum outer diameter section 3a, enables decreasing the thickness of the upper portion of the local maximum outer diameter section 3e which does not cover the outer periphery of the image pickup lens 2m, which has the largest diameter in the side wall of the lens barrel 3, but covers the outer periphery of the image pickup lens 2m'. This eliminates an unnecessary space and decreases the thickness of the lens barrel 3, thus making it possible to reduce the size of the camera module 40.

Here, assumes a cylindrical-shaped lens barrel 3 having the local maximum outer diameter section 3e but not having the maximum outer diameter section 3a which is a projection. In this case, a minimum value of the outer diameter of the lens barrel 3 is obtained by adding a possible minimum thickness of the lens barrel 3 to the outer diameter of the image pickup lens 2m.

On the other hand, the lens barrel 3 of Embodiment 1 has the maximum outer diameter section 3a which is a part of the local maximum outer diameter section 3e and is a protrusion formed in the shape of a belt or the like. In the lens barrel 3 of Embodiment 1, an outer diameter of the lens barrel 3 in a section other than the maximum outer diameter section 3a is inevitably smaller than the outer diameter of the lens barrel 3 in the maximum outer diameter section 3a.

Conversely, the outer diameter of the maximum outer diameter section 3a of the cylindrical-shaped lens barrel 3 not having the maximum outer diameter section 3a around the outer periphery of the image pickup lens 2m is made larger than the minimum value of the outer diameter of the cylindrical-shaped lens barrel 3.

In contrast, the camera module 40 including the lens barrel 3 of Embodiment 1 is arranged such that the lens barrel 3 has the maximum outer diameter section 3a which is a belt-shaped projection extending along the outer periphery of the image pickup lens 2m. This eliminates the need to forcibly decrease the thickness of the lens barrel 3. This is because even when the diameter of the local maximum outer diameter section 3e of the lens barrel 3 is made smaller, the outer diameter of the image pickup lens 2 around which the local maximum outer diameter section 3e is provided is also small.

In other words, considering, as a basis, the outer diameter of the lens barrel 3 around the outer periphery of the image pickup lens 2m, the example illustrated in FIG. 11 needs to have a maximum outer diameter section having a diameter larger than the diameter of the image pickup lens 2m, whereas the camera module 40 includes a maximum outer diameter section having the same diameter as the diameter of the image pickup lens 2m.

Note that, an area in which the maximum outer diameter section 3a is provided is one portion of the local maximum outer diameter section 3e and needs to include at least an area corresponding to the outer periphery of the image pickup lens 2m. The maximum outer diameter section 3a may be provided so as to extend to the outer periphery of the image pickup lens 2 whose lens diameter is not the largest. Moreover, an occupied area of the maximum outer diameter section 3a in the outer wall of the lens barrel 3 in the optical axis direction of the optical section 1 needs to be not smaller than the area corresponding to the outer periphery of the image pickup lens 2m. An occupied area smaller than the area corresponding to the outer periphery of the image pickup lens 2m may cause a thickness of the lens barrel 3 to be smaller than a permissible thickness and is therefore undesirable.

In other words, the maximum outer diameter section 3a is provided in a portion of an area of the local maximum outer diameter section 3e which portion includes an area corresponding to the outer periphery of the image pickup lens 2m, which is the largest in lens diameter among the plurality of image pickup lenses 2.

Next, the following discusses a state in which a large gap is provided between the lens barrel 3 and the lens holder 11 due to tolerances of the members in the embodiment illustrated in FIG. 1, with reference to FIGS. 2 and 3.

FIG. 2 is a cross-sectional view, illustrated as in FIG. 1, illustrating an arrangement in which the outer diameter of the lens barrel 3 is slightly smaller due to tolerances of the members. As a matter of course, this arrangement may be assumed that an inner diameter of the lens holder 11 is slightly larger.

In an example illustrated in FIG. 2, a gap is provided between the lens barrel 3 and the lens holder 11 in such a state that the sensor cover can be seen through the gap when viewed from the top surface side of the camera module 40. For example, in a case where a foreign matter or the like enters along the inner wall of the lens holder 11 from the top surface side of the camera module 40, a risk of the foreign matter or the like passing through the gap and falling onto the sensor cover 23 increases. The foreign matter or the like having fallen onto the sensor cover 23 may be moved onto the glass substrate 24 and then appear on a captured image.

The following further discusses the camera module 40 with reference to FIG. 3. FIG. 3 is an enlarged view illustrating a main part (an oval region enclosed by a dashed line in FIG. 2) of the camera module 40 illustrated in FIG. 2 and illustrating the structures of the lens barrel 3 and the lens holder 11.

Out of two arrows illustrated in FIG. 3, one arrow provided on a lens barrel 3 side indicates a foreign matter or the like falling along the outer wall of the lens barrel 3. Such a foreign matter is likely to stop at a step 3b formed by the local maximum outer diameter section 3e and the maximum outer diameter section 3a. Meanwhile, the other arrow provided on a lens holder 11 side indicates a foreign matter or the like falling along the inner wall of the lens holder 11. Such a foreign matter is likely to pass through a gap between the lens barrel 3 and the lens holder 11.

Embodiment 2

Figure 4:
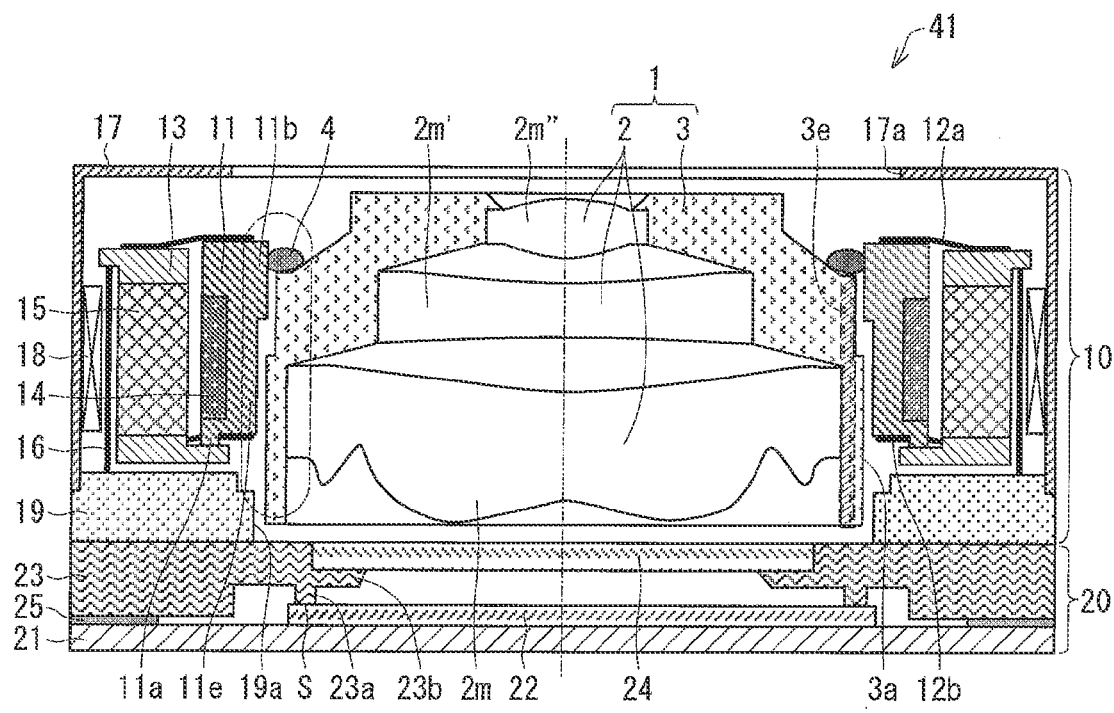
FIG. 4 is a central cross-sectional view illustrating a camera module of another embodiment of the present invention and illustrating a modification of the lens holder illustrated in FIG. 1.
Figure 5:
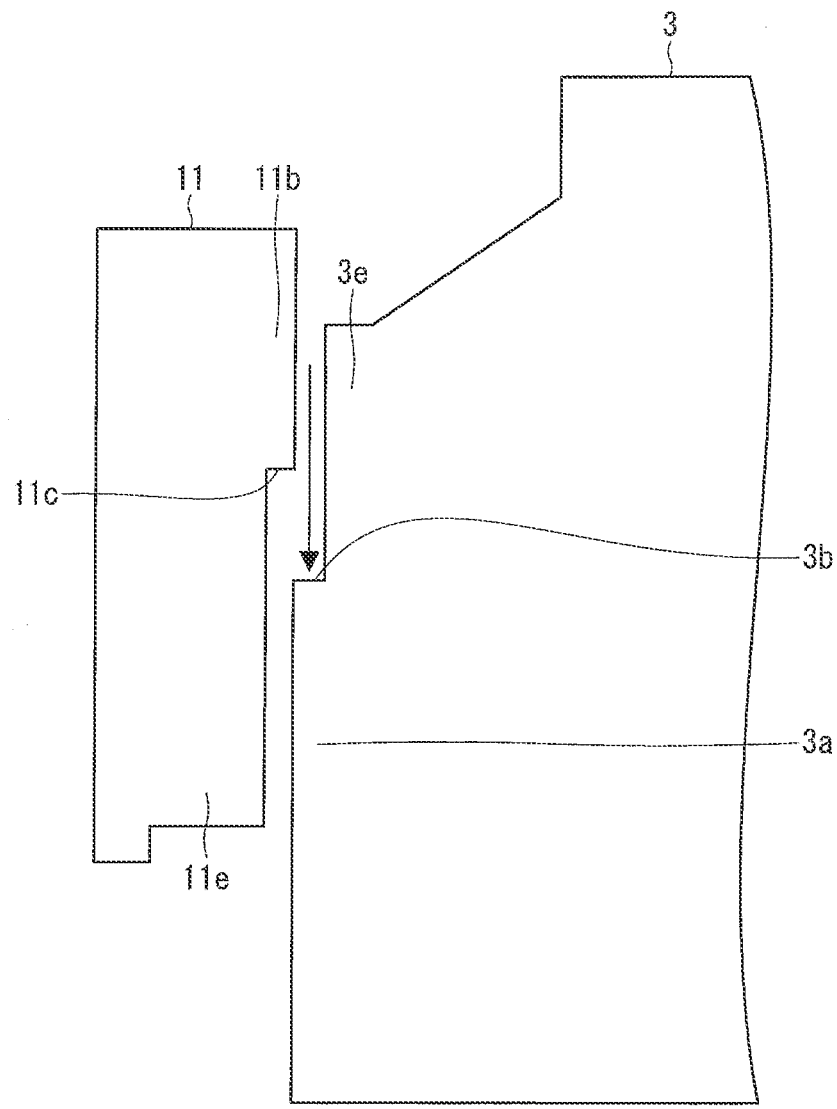
FIG. 5 is an enlarged view illustrating an oval region enclosed by a dashed line in FIG. 4 and illustrating the structures of a lens barrel and the lens holder in the camera module illustrated in FIG. 4.

The following discusses a structure for reducing the risk illustrated in FIG. 3, with reference to FIGS. 4 and 5.

FIG. 4 is a central cross-sectional view illustrating a camera module of Embodiment 2 and illustrating a modification of the lens holder illustrated in FIG. 1. FIG. 5 is an enlarged view illustrating a main part (an oval region enclosed by a dashed line in FIG. 4) of the camera module illustrated in FIG. 4 and illustrating the structures of a lens barrel and the lens holder.

A camera module 41 illustrated in FIG. 4 is different from the camera module 40 illustrated in FIG. 1 in the point that the camera module 41 is provided with a step structure on a hole side of a lens holder 11. Specifically, the lens holder 11 of the camera module 41 includes a minimum inner diameter section 11b, and a local minimum inner diameter section 11e whose inner diameter is larger than that of the minimum inner diameter section 11b. In other words, the minimum inner diameter section 11b is a portion coming into contact with a maximum outer diameter section 3a, when a lens barrel 3 slides inside the lens holder 11.

Here, the maximum outer diameter section 3a of the lens barrel 3 and the minimum inner diameter section 11b of the lens holder 11 do not overlap with each other in a height direction (in an optical axis direction of an optical section 1) of the camera module 41. A gap between the maximum outer diameter section 3a and the minimum inner diameter section 11b is structured by a small space extending in the height direction and a large space is formed in the center.

As indicated by an arrow in FIG. 5, a foreign matter or the like falling along the outer wall of the lens barrel 3 is likely to stop at a step 3b of the lens barrel 3. Meanwhile, the inner wall of the lens holder 11 has a step 11c formed by the minimum inner diameter section 11b and the local minimum inner diameter section 11e. Therefore, a foreign matter or the like falling along the inner wall of the lens holder 11 practically falls along an outer wall side of the lens barrel 3. This makes it possible to reduce a risk of the fall of the foreign matter or the like onto the sensor cover 23.

The above description assumes that a front insertion structure that the lens barrel 3 is inserted into the lens holder 11 from a top surface side (a side on which an object is provided) of the camera module 41. Therefore, an inner diameter of the minimum inner diameter section 11b of the lens holder 11 is set to be larger than an outer diameter of the maximum outer diameter section 3a of the lens barrel 3. With this arrangement, the camera module 41 has a lower risk of the fall of a foreign matter or the like onto the sensor cover 23 than the camera module 40, as described above. However, the camera module 41 is identical to the camera module 40 in the point that the sensor cover 23 can be seen when viewed from the top surface side of the camera module 41.

As described above, the camera module 41 is a camera module arranged such that the lens barrel 3 is inserted into the lens holder 11 from the side on which an object is provided, and the inner diameter of the minimum inner diameter section 11b may be larger than the outer diameter of the maximum outer diameter section 3a. That is, a side surface of the minimum inner diameter section 11b and a side surface of the maximum outer diameter section 3a, which are parallel to the optical axis, may be provided so that the side surface of the minimum inner diameter section 11b is located outside of the side surface of the maximum outer diameter section 3a, when viewed from above.

However, assuming a back insertion structure such that the lens barrel 3 is inserted into the lens holder 11 from the image pickup element 22 side, the inner diameter of the minimum inner diameter section 11b can be arranged so as to be smaller than the outer diameter of the maximum outer diameter section 3a. In a case where such a relation between the diameters is achieved, the sensor cover 23 cannot be seen through the gap between the lens barrel 3 and the lens holder 11 from the top surface side of the camera module 41. This makes it possible to further reduce the risk of the fall of the foreign matter or the like. Therefore, Embodiment 2 is more desirable embodiment. Note that, in the back insertion structure, the insertion of the lens barrel 3 is performed inevitably in a step preceding the mounting of the lens drive device 10 on the image pickup section 20. After the lens barrel 3 is inserted from below, the lens drive device 10 is mounted on the aforementioned jig to determine a height of the lens barrel 3. Then, the lens barrel 3 is fixed in the lens holder 11. After the jig is removed, the lens drive device 10 is mounted on the image pickup section 20.

As described above, the camera module 41 is a camera module arranged such that the lens barrel 3 is inserted into the lens holder 11 from the image pickup element 22 side, so that the inner diameter of the minimum inner diameter section 11b may be smaller than the outer diameter of the maximum outer diameter section 3a. That is, the side surface of the minimum inner diameter section 11b and the side surface of the maximum outer diameter section 3a, which are parallel to the optical axis, may be provided so that the side surface of the minimum inner diameter section 11b is located inside of the side surface of the maximum outer diameter section 3a, when viewed from the plane view.

The above configurations of the camera module 41 are examples suitably employed in a case where the minimum inner diameter section 11b is provided in such a position so as not to face the maximum outer diameter section 3a.

Embodiment 3

Figure 6:
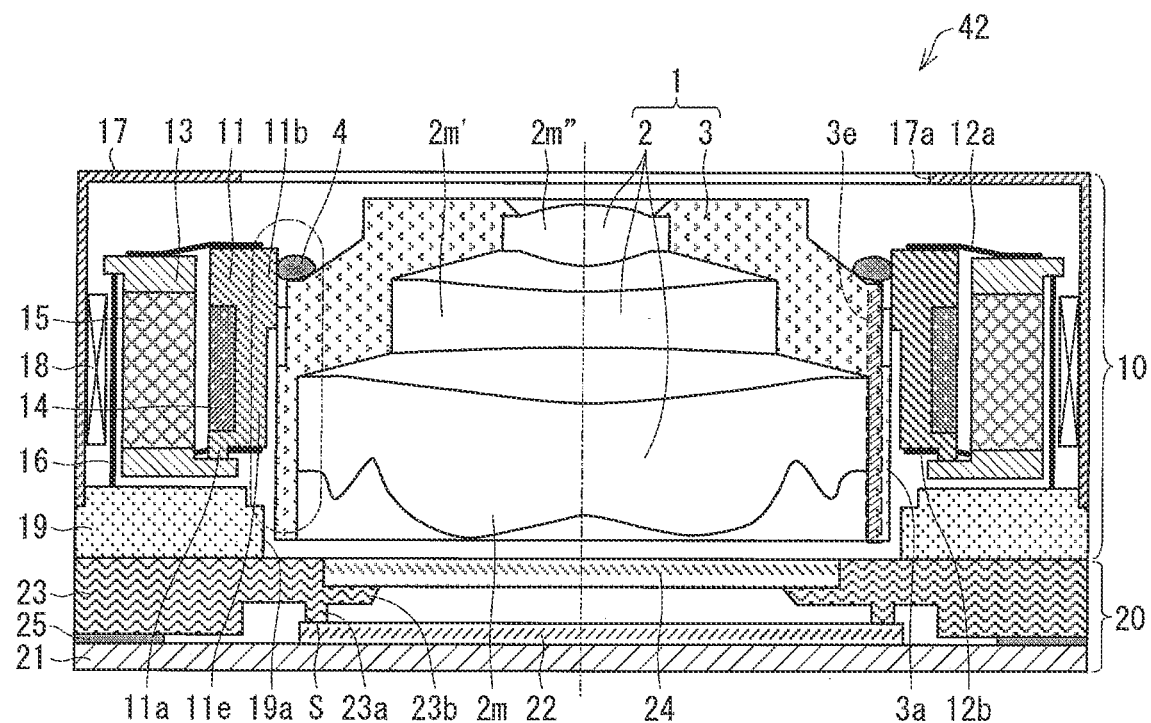
FIG. 6 is a central cross-sectional view illustrating a camera module of still another embodiment of the present invention and illustrating a modification of the lens barrel illustrated in FIG. 4.
Figure 8:
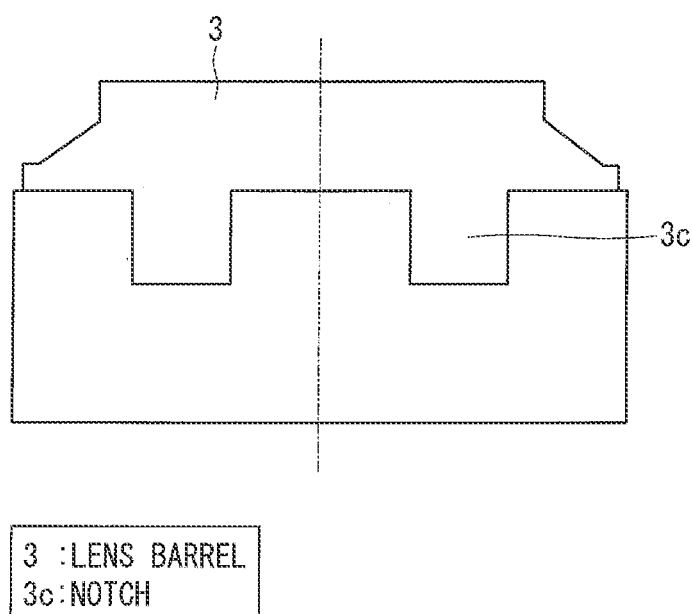
FIG. 8 is a side view illustrating the lens barrel illustrated in FIG. 7 when viewed from a direction indicated by an arrow.

The following discusses Embodiment 3 with reference to FIGS. 6 to 8.

FIG. 6 is a central cross-sectional view illustrating a camera module of Embodiment 3 and illustrating a modification of the lens barrel illustrated in FIG. 4. FIG. 7 is a top view illustrating a structure of the lens barrel illustrated in FIG. 6. FIG. 8 is a side view illustrating the lens barrel illustrated in FIG. 7 when viewed from a direction indicated by an arrow.

In a case where the front insertion structure is particularly assumed in the camera module 41 illustrated in FIG. 4, the outer diameter of the maximum outer diameter section 3a of the lens barrel 3 is smaller than the inner diameter of the minimum inner diameter section 11b of the lens holder 11. Considering dimensional tolerances of the members, a degree of freedom of widthwise displacement of the camera module (displacement in a direction vertical to the optical axis of the optical section 11) in such a state that the lens barrel 3 is inserted into the lens holder 11, is likely to become further larger than that of the camera module illustrated in FIG. 2. This is because there is no overlap portion between the maximum outer diameter section 3a and the minimum inner diameter section 11b.

In view of this, as illustrated in FIG. 6, a slight overlap section is provided between the maximum outer diameter section 3a and the minimum inner diameter section 11b. A camera module 42 having the overlap section between the maximum outer diameter section 3a and the minimum inner diameter section 11b can be lower than the camera module 41 in degree of freedom of widthwise displacement of the camera module in such a state that the lens barrel 3 is inserted into the lens holder 11.

In order to provide the overlap section in the camera module 42, the lens barrel 3 of the camera module 42 is formed in outer shape as illustrated in FIGS. 7 and 8. A portion of the outer wall of the lens barrel 3 which portion does not face the minimum inner diameter section 11b (for example, a substantially lower half portion of the lens barrel 3) has the maximum outer diameter section 3a extending across an outer periphery of the lens barrel 3. Meanwhile, a plurality of notches 3c are formed in a portion of the outer wall of the lens barrel 3 which portion can face the minimum inner diameter section 11b (for example, a substantially upper half portion of the lens barrel 3), wherein the notches 3c are cuts extending in the maximum outer diameter section 3a along the optical axis direction of the optical section 1. Further, a portion of the maximum outer diameter section 3a of the outer wall of the lens barrel 3 which portion is provided so as to face the minimum inner diameter section 11b overlaps the minimum inner diameter section 11b. Even in a case where the plurality of notches 3c are not provided, it is possible to achieve a lower degree of freedom of widthwise displacement of the camera module in such a state that the lens barrel 3 is inserted into the lens holder 11. Note, however, that the plurality of notches 3c can serve as adhesive collecting portions of the adhesive 4, thus enabling enhancement in adhesive strength caused by the adhesive 4.

As described above, the plurality of notches 3c may be formed in the portion of the maximum outer diameter section 3a of the lens barrel 3 which portion faces the minimum inner diameter section 11b.

The arrangement of the camera module 42 is suitably employed in a case where the minimum inner diameter section 11b is provided in such a position so as to face the maximum outer diameter section 3a in part or in entirety.

Embodiment 4

Figure 9:
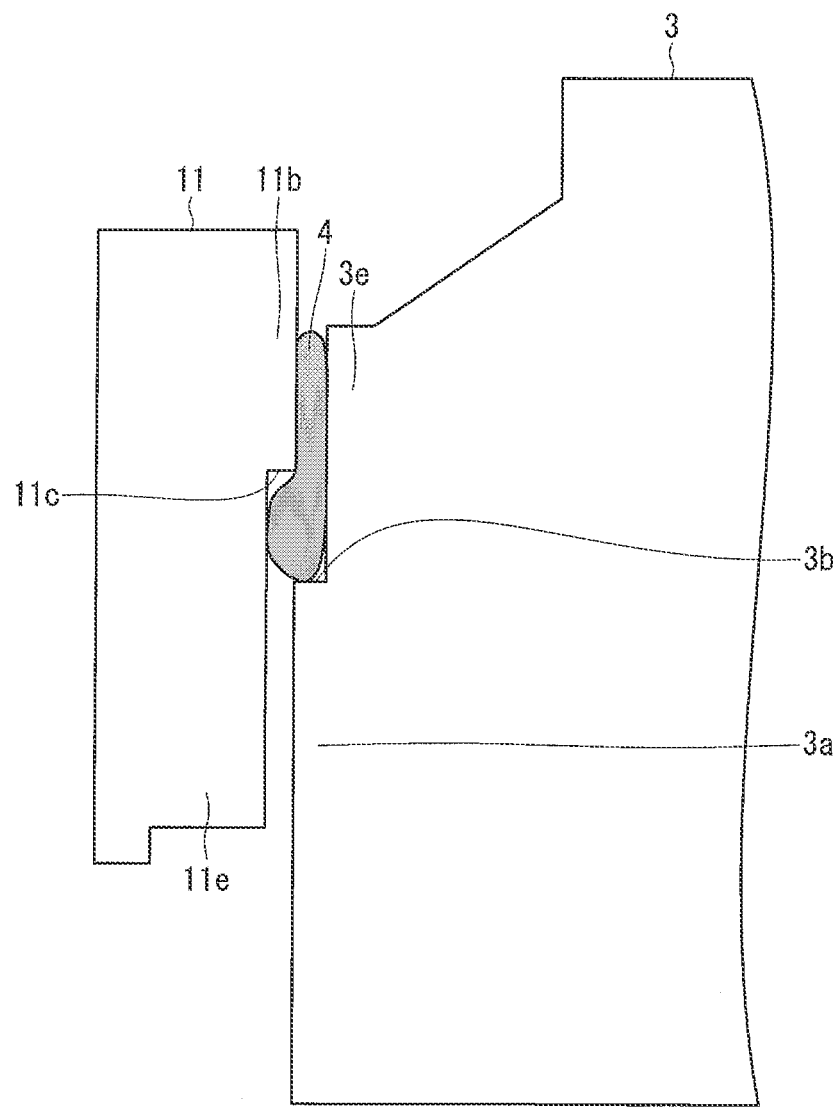
FIG. 9 is an enlarged view of the oval region enclosed by the dashed line in FIGS. 4 and 6, the view illustrating a state that a gap between a lens barrel and a lens holder is filled with an adhesive in the camera modules of FIGS. 4 and 6.
Figure 10:
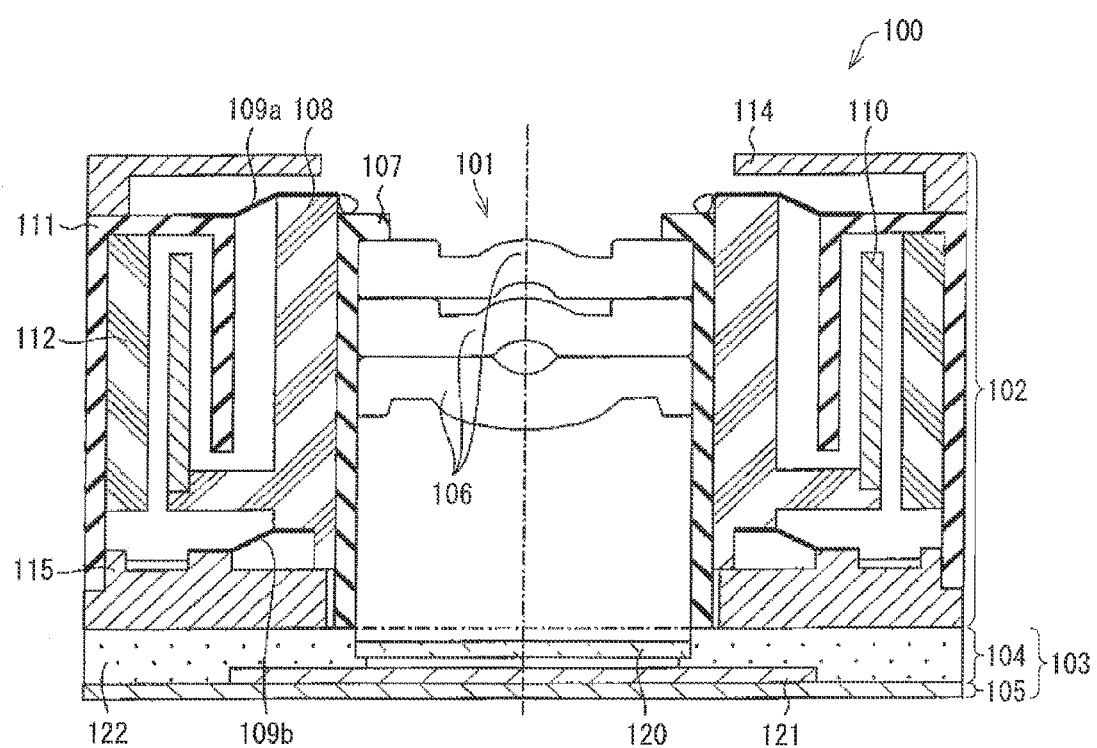
FIG. 10 is a cross-sectional view illustrating a structure of a conventional camera module.

The following discusses Embodiment 4 with reference to FIG. 9.

FIG. 9 is an enlarged view of the oval region enclosed by the dashed line in FIGS. 4 and 6, the view illustrating a state that a gap between a lens barrel and a lens holder is filled with an adhesive in the camera modules of FIGS. 4 and 6.

An adhesive 4 can be applied to a part of an area on the top surface side of the lens barrel 3, thereby fixing the lens barrel 3 to the lens holder 11. Here, a higher strength is achieved by causing the adhesive 4 to be applied to the portion of the lens barrel 3 on the top surface side and to be filled in the gap between the lens barrel 3 and the lens holder 11. However, simply filling the adhesive 4 in the gap between the lens barrel 3 and the lens holder 11 is not enough. It is desirable that the adhesive 4 is filled so as not to be peeled off at an interface with the lens barrel 3 or with the lens holder 11.

As illustrated in FIG. 9, the adhesive 4 filled in the gap between the lens barrel 3 and the lens holder 11 conforms to the shape of the gap so as to have a bending structure, thus going into a state of being bent. Therefore, the adhesive 4 serves as a wedge. This arrangement enables reducing the risk of peel-off of the adhesive 4. This is, for example, because a force enough to shear the adhesive 4 itself is required for the lens barrel 3 in particular to pop out upward.

Thus, the adhesive 4 for causing the lens barrel 3 to be adhered with respect to the lens holder 11 may be filled, in the state of being bent, in the gap between the lens barrel 3 and the lens holder 11.

(Consideration of Tilt of Lens Holder)

The following discusses a meaning of providing, when viewed along the optical axis direction of the optical section 1, an overlap section between the maximum outer diameter section 3a of the lens barrel 3 and the minimum inner diameter section 11b of the lens holder 11 by partially providing a plurality of notches 3c.

The attachment height and inclination of the lens barrel 3 are restricted with reference to the jig. Conversely, as long as the inclination of the cylindrical hole (inner wall) for installing the lens barrel 3 into the lens holder 11 falls within a tolerance range, the lens barrel 3 is not affected by the inclination. Thus, it is possible to achieve a camera module having a small static tilt. The following discusses such a tolerance limit of a tilt of the lens holder 11. Basically, the following description regarding a mathematical expression is the same as the description made according to the example illustrated in FIG. 11 because the present embodiment is different from the example illustrated in FIG. 11 in only a position of the maximum outer diameter section 3a of the lens barrel 3.

Assuming that $D_E$ is a diameter of the maximum outer diameter section 3a, H is a width of the overlap section (in the optical axis direction of the optical section 1) between the maximum outer diameter section 3a and the minimum inner diameter section 11b, and $D_1$ is an inner diameter (hole diameter) of the lens holder 11, $\theta_1$ which is the same as that of (b) of FIG. 11 is expressed, with use of $D_E$ and H, by the following expression:

$$\theta_1 = \tan^{-1}(H/D_E).$$

Assuming that $D_E$ is 5 mm and H is 0.5 mm, $\theta_1$ becomes 5.71 degrees. Generally, the tilt of the lens holder 11 does not reach 5.71 degrees. A relation in magnitude between the tilt $\theta$ and the tilt $\theta_1$ of the lens holder 11 is as illustrated in (b) of FIG. 11, and the difference $\theta_2$ between the tilt $\theta$ and the tilt $\theta_1$ is expressed by the following expression:

$$\theta_2 = \cos^{-1}(D_1/\sqrt{(D_E^2+H^2)}).$$

Accordingly, the tolerance tilt $\theta$ of the lens holder 11 is expressed by the following expression:

$$\theta \leq \theta_1 - \theta_2 = \tan^{-1}(H/D_E) - \cos^{-1}(D_1/\sqrt{(D_E^2+H^2)}).$$

In a case where the tilt of the lens holder 11 falls within the above range, a tilt of the lens barrel 3 is not increased by the tilt of the lens holder 11, and the lens barrel 3 can be fixed with respect to the jig. This achieves the camera module whose static tilt is small. For example, assuming that $D_1$ is 5.005 mm, $\theta_2$ becomes 5.11 degrees. Therefore, a tolerance tilt $\theta$ of the lens holder 11 is 0.6 degrees.

Note that, in a case where the lens barrel 3 and the lens holder 11 are configured as those of the camera module 41, gaps to be taken into consideration are two narrow gaps. One of the gaps is provided near the top surface side, and the other is provided near an image pickup element side. Among the two gaps, the smaller one is taken into consideration on the tolerance tilt $\theta$ is considered. Specifically, in a case where the gap provided on the upper surface side is smaller, $D_1$ is the inner diameter (hole diameter) of the minimum inner diameter section 11b, $D_E$ is the outer diameter of a portion of the lens barrel 3 which portion faces the minimum inner diameter section 11b, and H is a width of a region where the wall of the lens barrel 3 and the wall of the minimum inner diameter section 11b are located in close proximity to each other (in the optical axis direction of the optical section 1). Meanwhile, in a case where the gap at the image pickup element 22 side is smaller, $D_E$ is the outer diameter of the maximum outer diameter section 3a, $D_1$ is the inner diameter of a portion of the lens holder 11 which portion faces the maximum outer diameter section 3a, and H is a width of a region where the wall of the maximum outer diameter section 3a and the wall of the lens holder 11 are located in close proximity to each other (in the optical axis direction of the optical section 1).

(Desirable Shape of Maximum Outer Diameter Section)

A shape of a maximum outer diameter section 3a is desirably formed in the shape as illustrated in FIG. 1.

Specifically, an occupied area of the maximum outer diameter section 3a in the outer wall of the lens barrel 3 in the optical axis direction of the optical section 1 includes a whole area of an outer periphery of an image pickup lens 2m, and is slightly larger than the whole range of the outer periphery of the image pickup lens 2m. As illustrated in FIG. 1, a thickness which is equal to a widthwise thickness of the camera module 40 (thickness in a direction vertical to the optical axis of the optical section 1), is made remained on an upper surface side of a step 3b (See FIG. 3). If a thickness on the upper surface side is too large, a width of the step 3b in the optical axis direction becomes too large. As a result, the tolerance range of a tilt of the camera module 40 becomes narrow.

Embodiment 5

Figure 12:
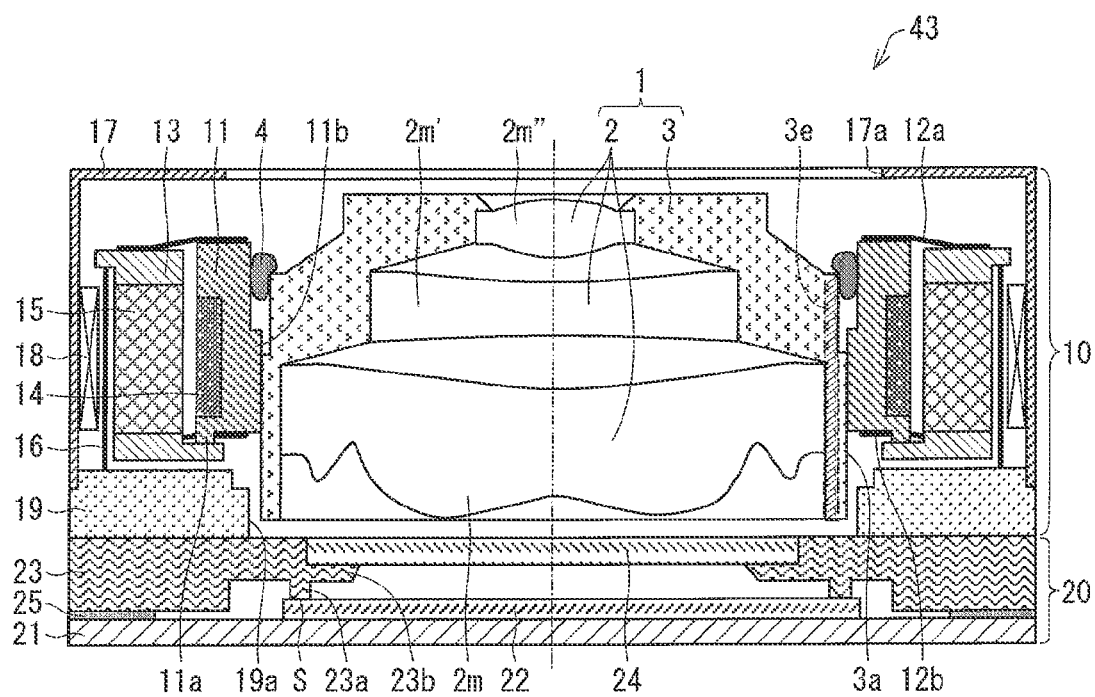
FIG. 12 is a central cross-sectional view illustrating a camera module of still another embodiment of the present invention and illustrating a modification of a lens holder.

The following discusses Embodiment 5 with reference to FIG. 12. FIG. 12 is a central cross-sectional view illustrating a camera module 43 according to Embodiment 5. The camera module 43 illustrated in FIG. 12 includes a lens holder 11 which is a modification of the lens holder 11 of the camera module 40 illustrated in FIG. 1.

In the camera module 40 illustrated in FIG. 1, an adhesive 4 for fixing a lens barrel 3 to a lens holder 11 is provided, by application or other method, in a hollow on an upper surface side of the lens barrel 3 (an inclined surface, of the side wall of the lens barrel 3, connecting (i) a side surface of a portion surrounding an outer periphery of an image pickup lens $2m''$ and (ii) a side surface of an upper portion of a local maximum outer diameter section 3e), so as to contact the lens holder 11. From the viewpoint of adhesive strength, it is more desirable that the adhesive 4 is not only applied in only the hollow on the top surface side of the lens barrel 3 but also is provided in a gap between the side surface of the lens barrel 3 and the lens holder 11 by injection or other method.

However, depending on a viscosity of the adhesive 4 used, the adhesive 4 may not go into the gap between the side surface of the lens barrel 3 (upper portion of the local maximum outer diameter section 3e) and the lens holder 11 by only applying the adhesive 4 in the hollow on the top surface side of the lens barrel 3.

This gives rise to the following drawbacks. That is, although the adhesive 4 needs to be applied into the gap between the side surface of the lens barrel 3 and the lens holder 11, it is difficult to insert a nozzle for application of the adhesive 4 into a narrow gap between the side surface of the lens barrel 3 and the lens holder 11 due to the shapes of the lens barrel 3 and the lens holder 11 illustrated in FIG. 1. Further, even in a case where the adhesive 4 is injected from a nozzle provided in the vicinity of the gap without the use of the nozzle directly inserted into the gap, it is difficult for the adhesive 4 to reach the innermost of the gap due to the narrow gap.

In view of this, in the camera module 43 according to Embodiment 5 and illustrated in FIG. 12, the minimum inner diameter section 11b of the lens holder 11 is provided in such a position so as to face the upper portion of the maximum outer diameter section 3a of the lens barrel 3.

Further, a lower portion of the inner wall of the lens holder 11 forms a minor diameter portion which protrudes inward by being provided with the minimum inner diameter section 11b. Meanwhile, an upper portion of the inner wall of the lens holder 11 forms a major diameter portion (local minimum inner diameter section) whose inner diameter is larger than the minimum inner diameter section 11b by being provided with a step in such a manner that a diameter of the upper portion is larger outward than that of the lower portion.

Further, (a) the upper portion of the local maximum outer diameter section 3e which upper portion is the minor diameter portion of the lens barrel 3 and (b) the major diameter portion which is the upper portion of the lens holder 11 are provided so as to face each other.

With this arrangement, a depressed part is formed by (i) a side surface of the upper portion of the local maximum outer diameter section 3e of the lens barrel 3 and (ii) the upper portion of the inner wall of the lens holder 11. A bottom of the depressed part is formed by (i) a step between the upper portion of the maximum outer diameter section 3a and the local maximum outer diameter section 3e, and (ii) a step between the minimum inner diameter section 11b of the lens holder 11 and the upper portion of the inner wall of the lens holder 11.

By forming the depressed part as described above, it becomes possible to increase a width of the gap between the lens barrel 3 and the top surface side of the lens holder 11. This makes it easier to insert the nozzle for application of the adhesive 4 into the gap (depressed part) or to bring the nozzle close to the gap, and then the applied adhesive 4 can easily permeate the gap.

Furthermore, in view of the drawback discussed with reference to FIG. 3, the camera module 43 illustrated in FIG. 12 is further provided with a step on the lens holder 11 side. This increases a possibility that a foreign matter falling along the inner wall of the lens holder 11 stops at the step.

Hence, in the camera module 43 illustrated in FIG. 12, it is possible to prevent the foreign matter from passing through the gap between the lens barrel 3 and the lens holder 11.

The camera module 43 illustrated in FIG. 12 makes it easy to apply the adhesive 4 into the gap between the lens barrel 3 and the lens holder 11. Therefore, by applying the adhesive 4 on the entire periphery of the lens barrel 3, it becomes easy to prevent an entry of the foreign matter falling into the camera module 43 through the gap between the lens barrel 3 and the lens holder 11.

CONCLUSION

In order to solve the above problem, a camera module according to an aspect of the present invention includes: an optical section including: a plurality of image pickup lenses; and a lens barrel for holding the plurality of image pickup lenses inside; a lens drive device, including a lens holder, for driving the lens holder integrally with the lens barrel, the lens holder allowing the lens barrel to be fixed therein after being adjusted in relative position with respect to the lens barrel; and an image pickup element for receiving light passing through the plurality of image pickup lenses, the lens barrel being slidable within the lens holder when the lens barrel is not fixed in the lens holder, the lens barrel being formed in a cylindrical shape extending in an optical axis direction of the optical section, the lens barrel including (i) a local maximum outer diameter section covering an outer periphery of the image pickup lens having the second largest lens diameter among the image pickup lenses and (ii) a maximum outer diameter section being a protrusion provided in the local maximum outer diameter section, and the maximum outer diameter section being provided in a portion of an area of the local maximum outer diameter section which portion includes an area corresponding to an outer periphery of the image pickup lens having the largest lens diameter among the image pickup lenses.

According to the above configuration, the maximum outer diameter section of the lens barrel is provided around the outer periphery of the image pickup lens having the largest lens diameter. This makes it possible to eliminate an unnecessary space, thus achieving size reduction of the camera module, Here, assumes a cylindrical-shaped lens barrel having the local maximum outer diameter section but not having the maximum outer diameter section. In this case, a minimum value of the outer diameter of the lens barrel is obtained by adding a possible minimum thickness of the lens barrel to the outer diameter of the image pickup lens having the largest lens diameter. On the other hand, the lens barrel has the maximum outer diameter section which is a part of the local maximum outer diameter section and is a protrusion formed in the shape of a belt or the like. In the lens barrel, an outer diameter of the lens barrel in a section other than the maximum outer diameter section is inevitably smaller than the outer diameter of the lens barrel in the maximum outer diameter section. Conversely, the outer diameter of the maximum outer diameter section of the cylindrical-shaped lens barrel not having the maximum outer diameter section around the outer periphery of the image pickup lens having the largest lens diameter is made larger than the minimum value of the outer diameter of the cylindrical-shaped lens barrel.

In contrast, according to the above configuration, the maximum outer diameter section is provided at the outer periphery of the image pickup lens having the largest lens diameter. This eliminates the need to forcibly decrease the thickness of the lens barrel. This is because even when the diameter of the local maximum outer diameter section of the lens barrel is made smaller, the outer diameter of the image pickup lens around which the local maximum outer diameter section is provided is also small.

In other words, considering, as a basis, the outer diameter of the lens barrel around the outer periphery of the image pickup lens having the largest lens diameter, a camera module of a conventional technique needs to have a maximum outer diameter section having a diameter larger than the diameter of the image pickup lens, whereas the camera module of the present invention includes a maximum outer diameter section having the same diameter as the diameter of the image pickup lens.

Note that, an area in which the maximum outer diameter section is provided is one portion of the local maximum outer diameter section and needs to include at least an area corresponding to the outer periphery of the image pickup lens having the largest lens diameter. The maximum outer diameter section may be provided so as to extend to the outer periphery of the image pickup lens whose lens diameter is not the largest. Moreover, an occupied area of the maximum outer diameter section in the outer wall of the lens barrel in the optical axis direction of the optical section needs to be not smaller than the area corresponding to the outer periphery of the image pickup lens having the largest lens diameter. An occupied area smaller than the area corresponding to the outer periphery of the image pickup lens having the largest lens diameter may cause a thickness of the lens barrel to be smaller than a permissible thickness and is therefore undesirable.

The camera module according to the above configuration yields the effect of achieving a further size reduction of the camera module while achieving a high-accuracy installation of the lens barrel.

Further, the camera module according to an aspect of the present invention is preferably such that: the lens holder includes (i) a minimum inner diameter section coming into contact with the maximum outer diameter section when the lens barrel slides inside the lens holder and (ii) a local minimum inner diameter section whose inner diameter is larger than that of the minimum inner diameter section; and the minimum inner diameter section is provided in such a position so as to face the maximum outer diameter section.

Furthermore, the camera module according an aspect of the present invention is preferably such that, of the local maximum outer diameter section of the lens barrel, a portion facing the lens holder and not having the maximum outer diameter section is provided so as to face the local minimum inner diameter section of the lens holder.

According to the above configuration, it is possible to provide a wide gap between, of the local maximum outer diameter section of the lens barrel, a portion facing the lens holder and not having the maximum outer diameter section and the local minimum inner diameter section of the lens holder. This allows the adhesive to be easily provided in the gap and therefore enhances an adhesive strength. Further, it is possible to prevent an entry of a foreign matter.

Furthermore, the camera module according to an aspect of the present invention is preferably such that: the lens holder includes (i) a minimum inner diameter section coming into contact with the maximum outer diameter section when the lens barrel slides inside the lens holder and (ii) a local minimum inner diameter section whose inner diameter is larger than that of the minimum inner diameter section; and the minimum inner diameter section is provided in such a position so as not to face the maximum outer diameter section.

According to the above configuration, a cross section of a gap between the lens holder and the lens barrel is in a shape of a step in a bending state. Therefore, it is not possible to see the bottom surface side of the camera module directly from the top surface side of the camera module. Even in a case where the foreign matter or the like enters the camera module from the top surface side, the foreign matter is usually unlikely to fall directly onto a glass substrate (infrared ray cut glass) for protecting an image pickup element.

Moreover, the camera module according to an aspect of the present invention is preferably such that: the lens barrel is inserted into the lens holder from a side on which an object is provided; and the inner diameter of the minimum inner diameter section is larger than an outer diameter of the maximum outer diameter section.

The above configuration allows the cross section of the gap between the lens holder and the lens barrel to be in the shape of the step in the bending state, while providing the front insertion structure. This allows reducing the risk of the fall of the foreign matter or the like.

Furthermore, the camera module according to an aspect of the present invention is preferably such that: the lens barrel is inserted into the lens holder from an image pickup element side; and the inner diameter of the minimum inner diameter section is smaller than an outer diameter of the maximum outer diameter section.

The above configuration allows the cross section of the gap between the lens holder and the lens barrel to be in the shape of the step in the bending state. In addition, the above configuration makes it possible to make the step larger as compared with the step provided by the front insertion structure. This allows further reducing the risk of the fall of the foreign matter or the like.

Further, the camera module according to an aspect of the present invention is preferably such that: the lens holder includes (i) a minimum inner diameter section coming into contact with the maximum outer diameter section when the lens barrel slides inside the lens holder and (ii) a local minimum inner diameter section whose inner diameter is larger than that of the minimum inner diameter section; and the minimum inner diameter section is provided in such a position so as to face a portion of the maximum outer diameter section.

According to the above configuration, it is possible to partially overlap the maximum outer diameter section of the lens barrel and the minimum inner diameter section of the lens holder. This makes it possible to improve an accuracy of determination of a center position of the lens barrel at the insertion of the lens barrel into the lens holder.

Furthermore, the camera module according to an aspect of the present invention is preferably such that: the maximum outer diameter section of the lens barrel includes a notch in a region facing the minimum inner diameter section.

The above configuration allows the notch to function as an adhesive collecting portion and allows the cross section of the gap between the lens holder and the lens barrel to be in the shape of the step in the bending state. This allows enhancing the adhesive strength, and reducing the risk of the fall of the foreign matter or the like.

Furthermore, the camera module according to an aspect of the present invention is preferably such that the camera module further includes an adhesive for causing the lens barrel and the lens holder to be adhered to each other, the adhesive being filled, in a bending state, in a gap between the lens barrel and the lens holder.

The above configuration allows the cross section of the gap between the lens holder and the lens barrel to be in the shape of the step in the bending state and allows the adhesive to be filled into the gap formed in the step shape. This makes it possible to enhance the adhesive strength.

Moreover, an electronic device according to an aspect of the present invention includes a camera module according to any one of aspects of the present invention.

According to the above configuration, the maximum outer diameter section of the lens barrel is provided around the outer periphery of the image pickup lens having the largest lens diameter. This makes it possible to eliminate an unnecessary space and achieve size reduction of the camera module, thus achieving size reduction of the electronic device.

The present invention is not limited to the description of the embodiments above, but may be altered by a skilled person within the scope of the claims. An embodiment based on a proper combination of technical sections disclosed in different embodiments is encompassed in the technical scope of the present invention. Further, the technical sections disclosed in the embodiments can be combined so as to form a new technical feature.

INDUSTRIAL APPLICABILITY

The present invention is suitably applicable to a camera module incorporated into electronic devices including a communication device such as a mobile terminal. The camera module is also applicable to a camera module having an autofocus function and an image stabilization function, and to a general camera module not having these functions.

REFERENCE SIGNS LIST

1: Optical section
2: Image pickup lens
2*m*: Image pickup lens
2*m'*: Image pickup lens
3: Lens barrel
3*a*: Maximum outer diameter section
3*e*: Local maximum outer diameter section
4: Adhesive
10: Lens drive device
11: Lens holder
11*b*: Minimum inner diameter section
11*e*: Local minimum inner diameter section
22: Image pickup element
40 to 43: Camera modules

The invention claimed is:

1. A camera module comprising:
an optical section including: a plurality of image pickup lenses; and a lens barrel for holding the plurality of image pickup lenses inside;
a lens drive device, including a lens holder, for driving the lens holder integrally with the lens barrel, the lens holder allowing the lens barrel to be fixed therein after being adjusted in relative position with respect to the lens barrel; and
an image pickup element for receiving light passing through the plurality of image pickup lenses,
the lens barrel being slidable within the lens holder when the lens barrel is not fixed in the lens holder,
the lens barrel being formed in a cylindrical shape extending in an optical axis direction of the optical section,
the lens barrel including a local maximum outer diameter section covering an outer periphery of an image pickup lens having a second largest lens diameter among the image pickup lenses,
the local maximum outer diameter section including (i) a maximum outer diameter section being a protrusion provided in the local maximum outer diameter section and (ii) an adjacent section having a diameter smaller than that of the maximum outer diameter section and being adjacent to the maximum outer diameter section,
the maximum outer diameter section being provided in a portion of an area of the local maximum outer diameter section which portion includes an area corresponding to an outer periphery of an image pickup lens having a largest lens diameter among the image pickup lenses,
the lens holder having an inner wall that faces the lens barrel when the lens barrel is fixed in the lens holder, the inner wall being provided so as to face both the maximum outer diameter section and the adjacent section.

2. The camera module as set forth in claim 1, wherein:
the lens holder includes (i) a minimum inner diameter section coming into contact with the maximum outer diameter section when the lens barrel slides inside the lens holder and (ii) a local minimum inner diameter section whose inner diameter is larger than that of the minimum inner diameter section; and
the minimum inner diameter section is provided in such a position so as to face the maximum outer diameter section.

3. The camera module as set forth in claim 2, wherein:
of the local maximum outer diameter section of the lens barrel, a portion facing the lens holder and not having the maximum outer diameter section is provided so as to face the local minimum inner diameter section of the lens holder.

4. The camera module as set forth in claim 1, wherein:
the lens holder includes (i) a minimum inner diameter section coming into contact with the maximum outer diameter section when the lens barrel slides inside the lens holder and (ii) a local minimum inner diameter section whose inner diameter is larger than that of the minimum inner diameter section; and
the minimum inner diameter section is provided in such a position so as not to face the maximum outer diameter section.

5. The camera module as set forth in claim 4, wherein:
the lens barrel is inserted into the lens holder from a side on which an object is provided; and
an inner diameter of the minimum inner diameter section is larger than an outer diameter of the maximum outer diameter section.

6. The camera module as set forth in claim 4, wherein:
the lens barrel is inserted into the lens holder from an image pickup element side; and an inner diameter of the minimum inner diameter section is smaller than an outer diameter of the maximum outer diameter section.

7. The camera module as set forth in claim 2, wherein:

the minimum inner diameter section is provided in such a position so as to face a portion of the maximum outer diameter section.

8. The camera module as set forth in claim 7, wherein:

the maximum outer diameter section of the lens barrel includes a notch in a region facing the minimum inner diameter section.

9. The camera module as set forth in claim 8, further comprising:

an adhesive for causing the lens holder and the lens barrel to be adhered to each other, the adhesive being filled, in a bending state, in a gap between the lens barrel and the lens holder.

10. An electronic device comprising a camera module recited in claim 1.

* * * * *